United States Patent [19]

Collins, Jr.

[11] Patent Number: 4,932,491
[45] Date of Patent: Jun. 12, 1990

[54] BODY STEERED ROVER

[75] Inventor: Earl R. Collins, Jr., La Canada, Calif.

[73] Assignee: The United States of America as represented by the Administrator of the National Aeronautics and Space Administration, Washington, D.C.

[21] Appl. No.: 326,815

[22] Filed: Mar. 21, 1989

[51] Int. Cl.⁵ .................. B62D 55/028; B62D 6/10
[52] U.S. Cl. .................................. 180/9.32; 180/22; 280/5.2
[58] Field of Search .............. 180/22, 209, 24.01, 180/24.02, 8.2, 9.32; 280/5.2, 5.22, DIG. 10

[56] References Cited

U.S. PATENT DOCUMENTS

| | | | |
|---|---|---|---|
| 1,358,575 | 11/1920 | Rimailho | 180/9.32 |
| 3,057,319 | 10/1962 | Wagner | 115/1 |
| 3,609,804 | 10/1971 | Morrison | 180/9 |
| 3,809,004 | 5/1974 | Leonheart | 180/22 |
| 4,480,401 | 11/1984 | Matsushiro | 446/456 |
| 4,676,765 | 6/1987 | McKay | 446/457 |

FOREIGN PATENT DOCUMENTS 644320 7/1962 Canada .

Primary Examiner—Mitchell J. Hill
Attorney, Agent, or Firm—Thomas H. Jones; John R. Manning; Charles E. B. Glenn

[57] ABSTRACT

A rough terrain vehicle is described which includes auxiliary wheels that can be deployed to avoid overturning the vehicle when turning while traversing a slope, to climb an embankment or the like, and to right the vehicle when it is overturned. The vehicle includes a pair of front and rear primary wheels, and a pair of auxiliary arms having inner ends pivotally mounted on the front wheel axes and outer ends that carry auxiliary wheels. A motor can turn the arms to move the auxiliary wheels from a stowed position about halfway between the front and rear wheels and above the ground, to a second position against the ground to stabilize the vehicle. The arms can be turned more than 180° to move the auxiliary wheels in front of the front primary wheels to help climb an embankment. The primary wheels can be mounted at the end of primary arms, so when the primary arms are turned they not only move the primary front wheels but also the inner ends of the auxiliary arms.

8 Claims, 4 Drawing Sheets

U.S. Patent   Jun. 12, 1990   Sheet 1 of 4   4,932,491
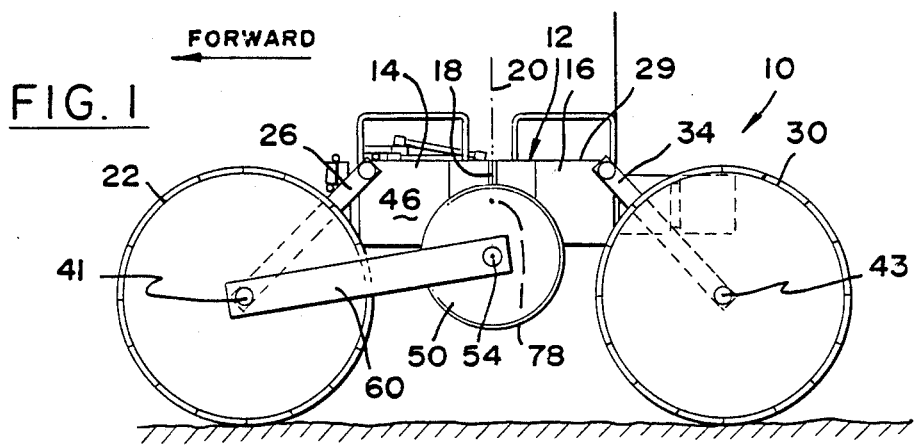
FIG. 1
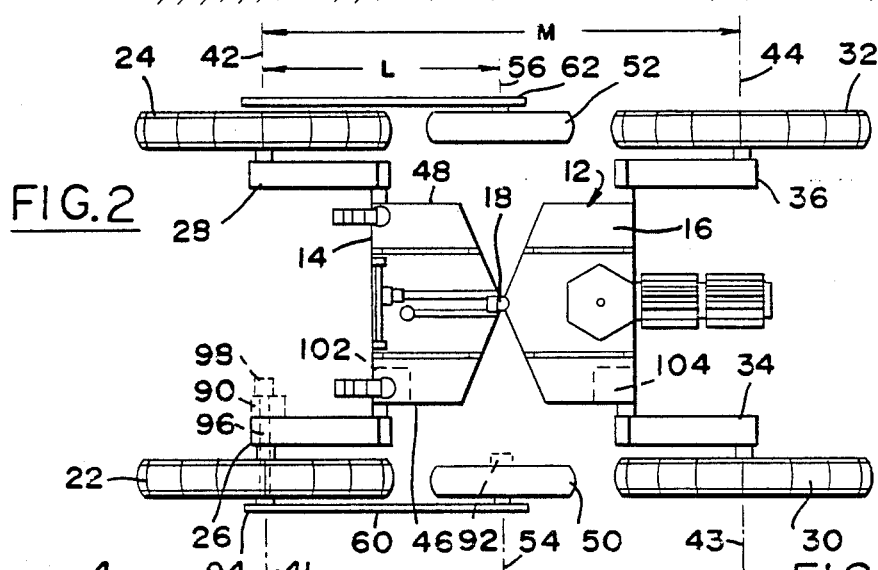
FIG. 2
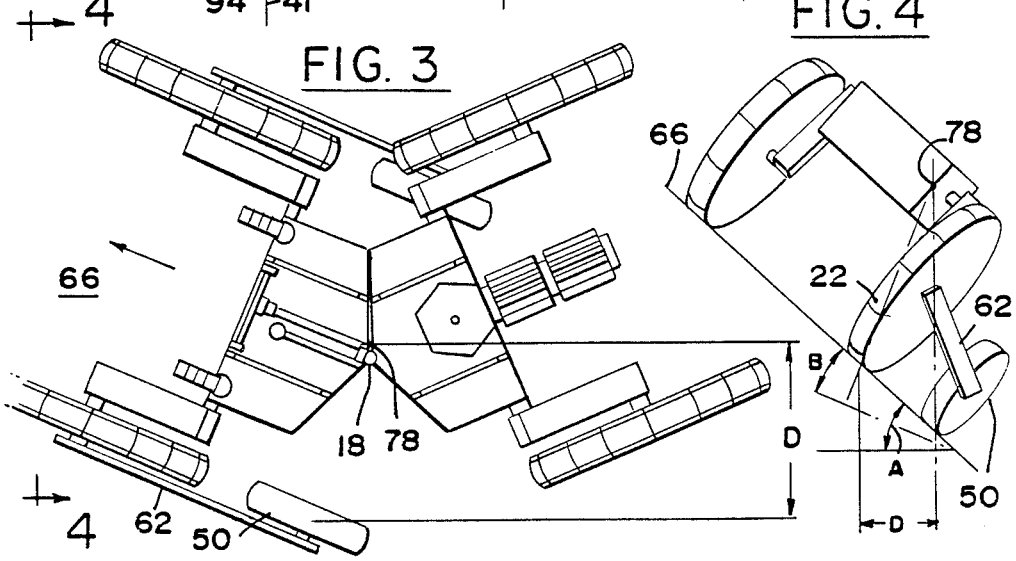
FIG. 3
FIG. 4

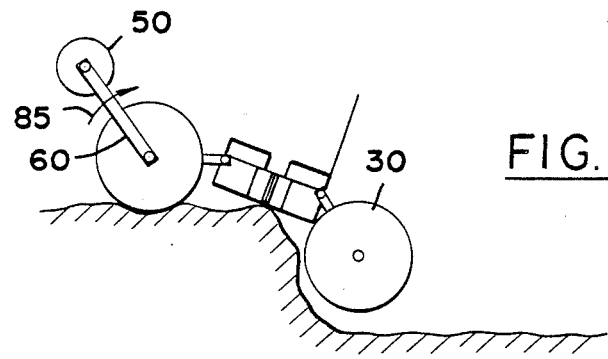
FIG. 5F
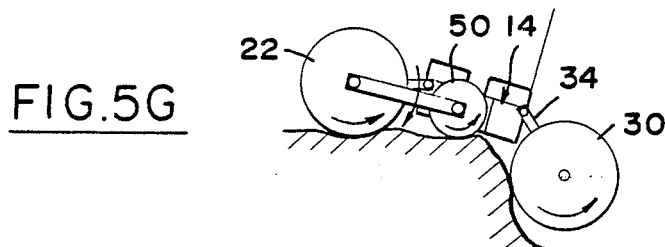
FIG. 5G
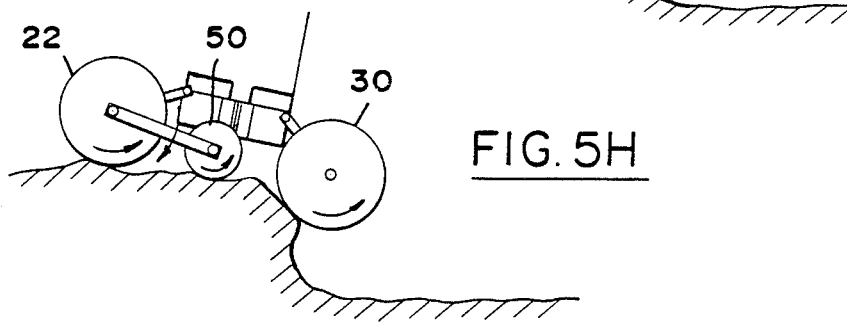
FIG. 5H
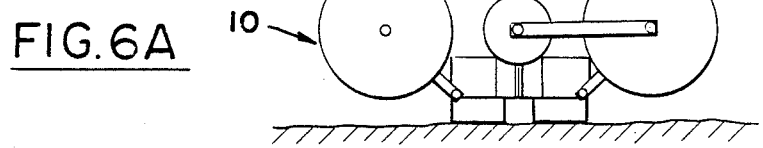
FIG. 6A
FIG. 6B
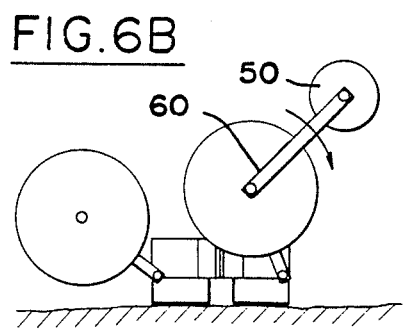
FIG. 6C
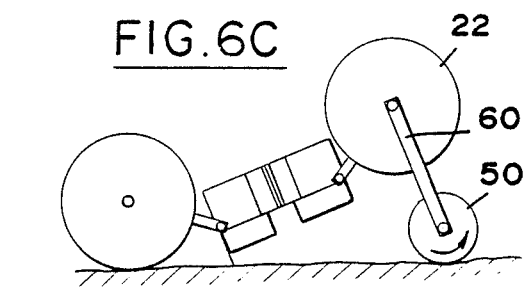

BODY STEERED ROVER

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

This invention relates to rough terrain vehicles, and to a device that increases stability and versatility in movement.

BACKGROUND ART

Rovers, or rough terrain vehicles, can be unmanned, as for use in a contaminated terrain or on the moon or other planets, or manned. One type of rough terrain vehicle is a body-steered type which includes a chassis having front and rear portions that are pivotally connected about a vertical axis. Steering takes place by causing a yaw deflection between the front and rear portions. Rough terrain can be accommodated by allowing relative pitch deflections between the front and rear portions, pitch deflections generally being locked out during travel on smooth terrain. When such vehicles traverse steep slopes, they are subject to upset especially when making a turn from a partially downhill course to an uphill course. An apparatus which increased stability for such vehicles while making such turns, would be of considerable value.

Two other situations where the performance of rough terrain vehicles could be improved, is in climbing ledges or embankments of moderate height, and in enabling righting of a turned-over vehicle, the latter being especially useful for unmanned vehicles. A rough terrain vehicle, especially of the body-steered type, which had enhanced stability for traversing and which could right itself, would be of considerable value.

STATEMENT OF THE INVENTION

In accordance with one embodiment of the present invention, a rough terrain vehicle is provided, which has enhanced stability and versatility. The vehicle includes primary front and rear wheels mounted on a chassis, and a pair of auxiliary arms each having inner ends pivotally mounted near one of the primary wheel axes and an outer end that carries an auxiliary wheel. The arms can be held in a stowed position where the auxiliary wheels lie between the front and rear primary wheels. The arm can be turned to move the auxiliary wheels down against the ground at locations between the front and rear primary wheels.

The arms preferably can be turned by more than 180° to locate the auxiliary wheels in front of the front primary wheels, to climb a ledge. This arrangement also aids in righting an overturned vehicle. The front and/or rear primary wheels are preferably mounted on primary arms that can be pivoted to further increase the versatility of the vehicle.

The novel features of the invention are set forth with particularity in the appended claims. The invention will be best understood from the following description when read in conjunction with the accompanying drawings.

BRIEF DESCRIPTION OF THE DRAWINGS

FIG. 1 is a side elevation view of a rough terrain vehicle constructed in accordance with the present invention.

FIG. 2 is a plan view of the vehicle of FIG. 1.

FIG. 3 is a view similar to that of FIG. 2, but showing the vehicle turning while traversing a slope.

FIG. 4 is a simplified view taken on the line 4—4 of FIG. 3.

FIGS. 5A through 5H are side elevation views of the vehicle of FIG. 1, showing steps in the climbing of a ledge.

FIGS. 6A through 6I are side elevation views of the vehicle of FIG. 1, shown in the righting of an overturned vehicle.

DETAILED DESCRIPTION OF THE INVENTION

Figure 5A:
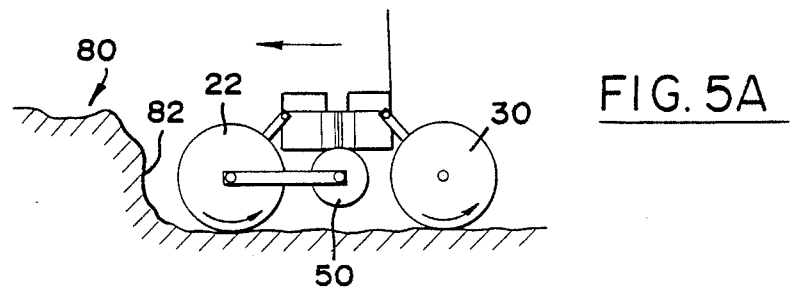

FIGS. 1 and 2 illustrate a rough terrain vehicle 10 which includes a frame or chassis 12 having front and rear portions 14, 16 connected at a hinge joint 18 that permits relative pivoting about a vertical axis 20. A pair of primary front wheels 22, 24 are mounted at the ends of front arms 26, 28 on the body 29 of the chassis. Similarly, a pair of primary rear wheels 30, 32 are mounted at the end of rear arms 34, 36 of the chassis body. The four primary wheels can rotate about axes 41-44 that extend parallel to one another and in a lateral direction which is between opposite sides 46, 48 of the chassis.

In order to provide enhanced stability and versatility for the vehicle, it is provided with a pair of secondary or auxiliary wheels 50, 52. The auxiliary wheels are mounted on laterally-extending axes 54, 56 at the outer ends of auxiliary arms 60, 62. The inner ends of the auxiliary arms are mounted about the same axes 41, 42 as the front primary wheels, although they could be offset therefrom. The auxiliary arms 60, 62 can be turned about the axes 41, 42 to aid operation of the vehicle in a wide variety of circumstances. The auxiliary arms 60, 62 have a length chosen so that in the stowed position of FIG. 1 each auxiliary wheel such as 50 lies about halfway between corresponding front and rear primary wheels 22, 30. That is, the length L of the auxiliary arm is preferably between 25% and 75% of the distance M between front and rear primary wheels in their usual position, wherein the primary arms 26, 34 extend at 45° downward angles.

FIGS. 3 and 4 illustrate a situation where the vehicle 10 is traversing a steep slope 66 extending at a large angle A from the horizontal, and with the vehicle turning from a downhill course to an uphill course. This is a worst case scenario, where the center of gravity of the vehicle, at the location 78 which lies close to the hinge 18, tends to cause the vehicle to roll over. Such upset of the vehicle is avoided by lowering the auxiliary arms, especially the arm 62 at the downhill side of the vehicle, so the auxiliary wheel 50 bears on the ground. In this situation, the bottom of the auxiliary wheel 50 lies a considerable distance D horizontally outboard of the bottom of the primary wheel such as 22, and greatly aids in stabilizing the vehicle. For the particular configuration shown in the figures, the auxiliary wheel allows the vehicle to avoid rolling in such a manoeuver for a slope A of 40°. Without the auxiliary wheels, the vehicle would turn over at a slope angle B from the horizontal of only 20°.

Figure 5B:
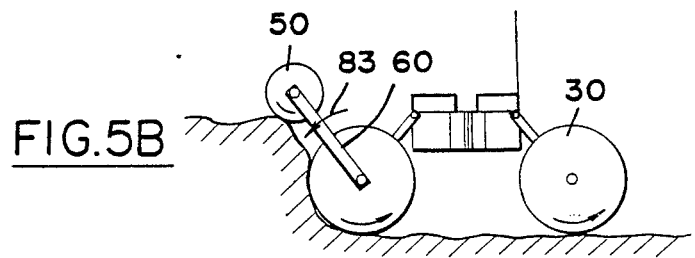
Figure 5C:
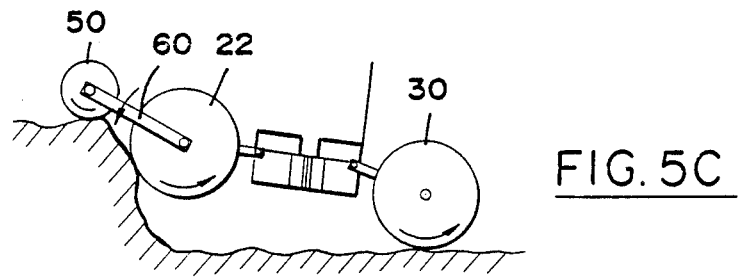

FIGS. 5A through 5H show how the auxiliary wheels enables the vehicle to climb a ledge 80 having a steep side wall 82 but only moderate height. FIG. 5A shows the vehicle with the auxiliary wheels such as 50 in a stowed position lying about halfway between the corresponding front and rear primary wheels 22, 30 and lying above the ground. FIG. 5B shows the auxiliary arm 60 turned in a counterclockwise direction 83 as seen in the figure, to move the auxiliary wheel 50 to the top of the ledge or beyond and to lower it against the ground thereat. FIG. 5C shows the auxiliary arm 60 pivoted even further in a counterclockwise direction to lift the front primary wheel 22 off the ground. The primary arms 26, 34 are pivoted toward the horizontal to increase the wheel base and to raise the primary wheel. At this time, both primary wheels 22, 30 are preferably rotated to move the vehicle forward. Forward movement is enhanced by also rotating the auxiliary wheel 50 to move the vehicle forward along the ledge, although such forward rotation of the auxiliary wheel is not always necessary to climb a ledge.

Figure 5D:
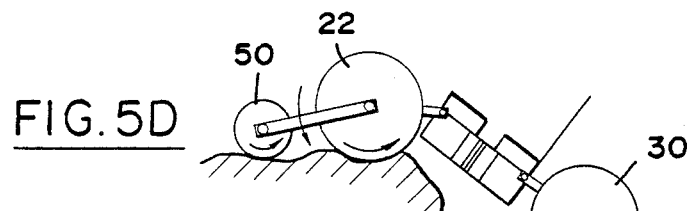
Figure 5E:
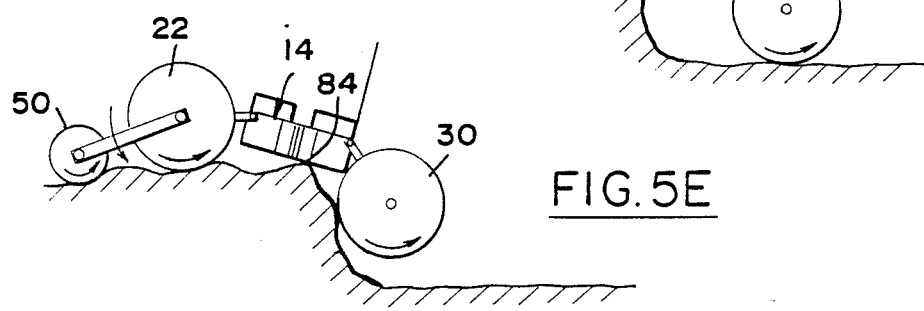

FIG. 5D shows the vehicle with its forward half having climbed the ledge, while FIG. 5E shows an attempt to move the rear wheel 30 up the ledge. Such movement can be hampered by contact of the chassis 14 with the ground location 84. FIG. 5F shows the auxiliary arm 60 rotated in a clockwise direction 85 to the position of FIG. 5G against a ground location between the front and rear primary wheels to help lift the middle of the chassis 14 off the ground. The rear primary arm 30 can be turned to shift more weight to the auxiliary wheel. Driving of the primary wheels, preferably also the auxiliary wheel 50, can now move the vehicle completely over the ledge to the position of FIG. 5H. Then the auxiliary wheel 50 can be lifted off the ground to the stowed position of FIG. 1.

Figure 6D:
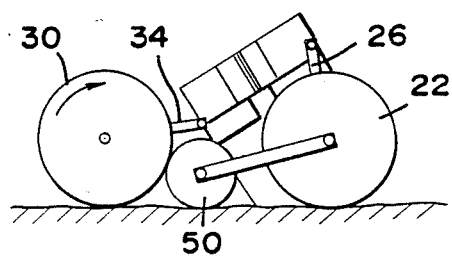
Figure 6E:
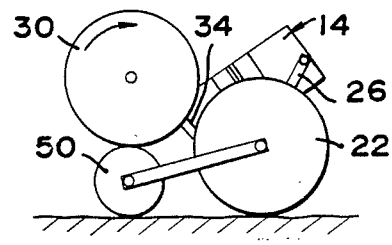
Figure 6F:
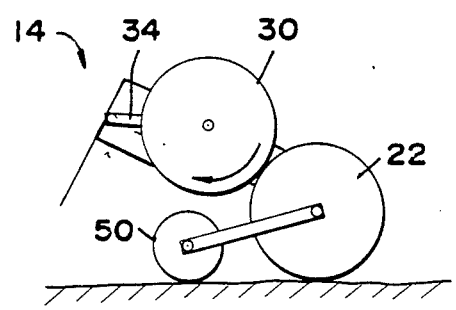

FIGS. 6A through 6F show how the auxiliary wheels such as 50 are useful in righting the vehicle 10 from the overturned position shown in FIG. 6A. As shown in FIG. 6B, the auxiliary arm 60 is rotated clockwise to the position of FIG. 6C wherein the auxiliary wheel 50 lifts the front primary wheel 22 off the ground. Such rotation of the auxiliary arm continues until, in FIG. 6D, the auxiliary wheel lies between the front and rear primary wheels 22, 30. The rear arm 34 is then pivoted to raise the rear wheel 30 to the position of FIG. 6E, while the front arm 26 is pivoted to orient the chassis 14 as shown in FIG. 6F. During such motion, the auxiliary wheel supports the rear primary wheel 30 above the ground. The arms 34, 26 continue to turn to move the rear wheel 30 through the positions 6G, 6H.

Figure 6G:
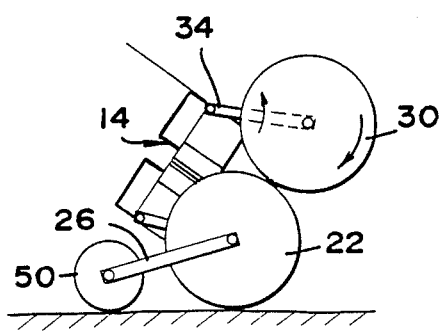
Figure 6H:
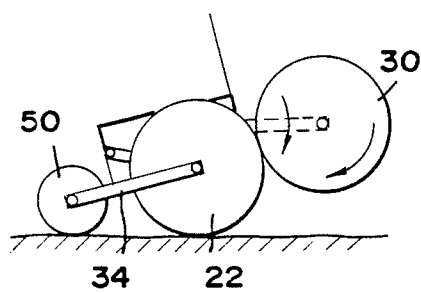
Figure 6I:
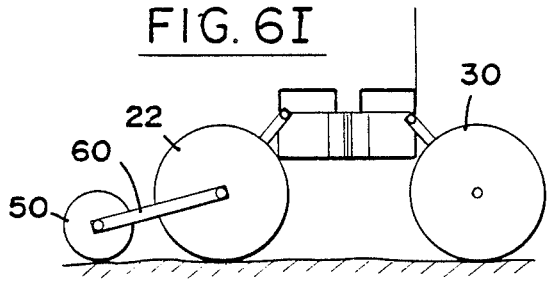

During movement of the rear wheel from position 6D to 6H, its movement can be facilitated by locking the auxiliary wheel 50 against rotation while the rear wheel 30 is rotated to climb (FIG. 6E) the auxiliary wheel 50. During such climbing the front arm 26 is turned to keep the rear wheel 30 in contact with the auxiliary wheel. This continues until the rear wheel contacts and climbs over the front wheel 22 as shown in FIGS. 6F through 6H. After the vehicle reaches the position of FIG. 6H and the rear wheel 30 is moved onto the ground, the front and rear arms can be pivoted to the position of FIG. 6I to separate the front and rear primary wheels 22, 30. The auxiliary wheel 50 can then be moved to the stowed position between the primary wheels.

During righting of the vehicle as shown in FIGS. 6A through 6F, its orientation is constantly controlled. That is, the vehicle does not "flop" over in an action where a part of the vehicle is in free fall until it "hits" the ground, and wherein the vehicle or its contents might be damaged. Maintenance of control during righting also can avoid an additional rollover during such "flop" over where righting is done in very rough terrain.

Since the auxiliary wheels such as 50 do not normally contact the ground, and are designed to often fit into the space between the primary wheels, the auxiliary wheels are preferably much smaller than the primary wheels. The auxiliary arm such as 60 preferably holds the auxiliary wheel about halfway between the front and rear primary wheels in the stowed position of FIG. 1, when the forward and rearward arms 26, 34 extend at about 45° from the vertical and horizontal. The auxiliary wheels 50, 52 preferably lie on the sides of their auxiliary arms closest to the chassis 14, to minimize the width of the vehicle and to enable the rear wheel to climb on the front wheel in the righting procedure as shown in FIG. 6E.

The wheels and arms can be turned by a variety of drive mechanisms, including chains, hydraulic motors, and electric motors. In one arrangement indicated in FIG. 2, a motor 90 is coupled to the primary wheel 22 to drive it, while a motor 92 is coupled to the auxiliary wheel 50 to drive it. The inner end 94 of the auxiliary arm is mounted on the end of an auxiliary shaft 96 that extends within a primary shaft on which the primary front wheel 22 is mounted. Another motor 98 is coupled to the auxiliary shaft 96 to turn it. Similar electric motors can be used to drive all primary wheels and to turn both auxiliary shafts and auxiliary wheels. Other motors 102, 104 are shown coupled to the inner end of the front and rear arm 26, 34 to turn them, and similar motors can be used to turn the other arms which hold the primary wheels.

Thus, the invention provides a rough terrain vehicle of high stability and versatility. This is accomplished by providing a pair of auxiliary wheels mounted on the ends of auxiliary arms that can be turned to move the auxiliary wheels against and away from the ground. The auxiliary arms are preferably turnable by more than 180° to move the auxiliary wheels down against the ground at a location between the front and rear wheels to stabilize the vehicle when turning while traversing a slope, and to move the auxiliary wheels in front of the vehicle to aid in climbing a ledge or even to right a turned-over vehicle.

Although particular embodiments of the invention have been described and illustrated herein, it is recognized that modifications and variations may readily occur to those skilled in the art and consequently it is intended to cover such modifications and equivalents.

I claim:

1. In a rough terrain vehicle which includes a chassis having front and rear portions and laterally spaced opposite sides, a pair of front primary wheels on either side of the chassis, and a pair of rear primary wheels on either side of the chassis, the primary wheels being rotatably mounted on the chassis about parallel lateral axes, the improvement including:

a pair of auxiliary arms each having an inner end pivotally mounted about an arm axis on said chassis and each having an outer end, said arms being mounted on opposite sides of said chassis;

a pair of auxiliary wheels mounted on the outer ends of said arms;

means coupled to said arms for turning them about their inner ends;

said arms being of a length to move said auxiliary wheels so each lies about halfway between the front and rear primary wheels at the corresponding side of said chassis;

motor means for turning said arms to first positions to move said auxiliary wheels to first positions wherein they lie against the ground and between front and rear primary wheels, and for turning said arms to stowed positions wherein said auxiliary wheels lie above the ground and between front and rear primary wheels.

2. The improvement described in claim 1 wherein:

said inner ends of said arms are mounted on the front portion of said chassis; and said motor means is constructed to turn said arms to third positions wherein said auxiliary wheels lie forward of said front primary wheels, said motor means generating sufficient torque to turn said arms to lift the front portion of said chassis and said primary wheels off the ground.

3. The improvement described in claim wherein:, said forward primary wheels are mounted along a forward primary axis, said inner ends of said arms lie on sides of said forward primary wheels that are farthest from said chassis, and said auxiliary wheels each lie on a side of a corresponding arm which is closest to the chassis.

4. The improvement described in claim 1 wherein:

said chassis includes a body with front and rear portions, and a pair of front and rear primary arms respectively pivotally mounted on said front and rear body portions, each of said primary arms having an inner end mounted on said body and an outer end;

said front and rear wheels mounted on the other ends respectively at said front and rear primary arms;

the inner ends of said auxiliary arms being pivotally mounted on the outer ends of said front primary arms, whereby to enable further extension of the auxiliary wheels.

5. A rough terrain vehicle comprising:

a chassis which includes a body with opposite sides and with front and rear portions, a pair of front primary arms having inner ends pivotally mounted on either side of said body front portion, and having outer ends and a pair of rear primary arms having inner ends pivotally mounted on either side of said body rear portion and having outer ends;

a pair of front primary wheels rotatably mounted on the outer ends of said front arms, and a pair of rear primary wheels rotatably mounted on the outer ends of said rear arms;

means for turning said primary arms about their inner ends;

a pair of auxiliary arms, each having an inner end pivotally mounted on the outer end of one of said front primary arms and an outer end;

a pair of auxiliary wheels each rotatably mounted on the outer end of one of said auxiliary arms.

6. The rough terrain vehicle described in claim 5 wherein:

said means for turning said primary arms can position them in a predetermined position to extend at about 45° downward angles from the horizontal with the front and rear primary arms extending away from each other at progressively lower locations therealong;

said auxiliary arm is of a length to position each of said auxiliary wheels about halfway between corresponding front and rear primary wheels when said primary arms lie in said predetermined position.

7. A rough terrain vehicle comprising:

a chassis having front and rear portions and front and rear primary wheel axes, at least a first of said chassis portions including a body connected to the other chassis portion and a pair of primary arms that each has an inner end pivotally mounted on said body and an outer end defining one of said primary wheel axes;

a plurality of primary wheels rotatably mounted on said primary wheel axes;

a pair of auxiliary arms, each having an inner end pivotally mounted on the outer end of one of said primary arms on the primary wheel axis thereof, and having an outer end which includes an auxiliary wheel axis;

a pair of auxiliary wheels, each rotatably mounted on the outer end of one of said auxiliary arms substantially about the auxiliary axis thereat; and means for turning each of said primary arms about its inner end, and for turning each of said auxiliary arms about the axis at its inner end.

8. A rough terrain vehicle comprising:

a chassis having front and rear portions and front and rear primary wheel axes;

a plurality of primary wheels rotatably mounted on said frame about said axes;

a pair of auxiliary arms, each having an inner end pivotally mounted substantially about one of said wheel axes and having an outer end which includes an axillary wheel axis;

a pair of auxiliary wheels, each rotatably mounted on the outer end of one of said auxiliary arms about the auxiliary axis thereat; and means for turning each of said auxiliary arms about the axis at its inner end;

said front and rear primary wheels have a predetermined usual separation when the vehicle is moving along even ground;

each of said arms has a length, as measured between the axes at its inner and outer ends, which is between 25% and 75% of said predetermined distance between said front and rear primary wheels.

* * * * *